United States Patent
Grace

(10) Patent No.: US 8,495,879 B2
(45) Date of Patent: Jul. 30, 2013

(54) COMPRESSED AIR VEHICLE HAVING ENHANCED PERFORMANCE THROUGH USE OF MAGNUS EFFECT

(76) Inventor: Winston Grace, Tamarac, FL (US)

( * ) Notice: Subject to any disclaimer, the term of this patent is extended or adjusted under 35 U.S.C. 154(b) by 378 days.

(21) Appl. No.: 12/838,067

(22) Filed: Jul. 16, 2010

(65) Prior Publication Data

US 2012/0011853 A1    Jan. 19, 2012

(51) Int. Cl.
*F01K 9/00* (2006.01)

(52) U.S. Cl.
USPC ............... 60/690; 60/650; 60/659; 416/4

(58) Field of Classification Search
USPC ............. 60/645, 650, 643, 685, 693, 694, 60/721, 659, 682, 683, 684; 416/4; 415/90
See application file for complete search history.

(56) References Cited

U.S. PATENT DOCUMENTS

| | | | |
|---|---|---|---|
| 1,932,698 A * | 10/1933 | Jose | 180/302 |
| 2,417,358 A * | 3/1947 | Grose | 244/21 |
| 2,985,406 A | 5/1961 | Bump | |
| 4,161,154 A | 7/1979 | Kollenberger | |
| 5,875,627 A | 3/1999 | Jeswine | |
| 6,527,223 B1 | 3/2003 | Mondale | |
| 7,213,786 B1 | 5/2007 | McKinney | |

* cited by examiner

*Primary Examiner* — Kenneth Bomberg
*Assistant Examiner* — Wesley Harris
(74) *Attorney, Agent, or Firm* — Mark D. Bowen; Malin Haley DiMaggio & Bowen, P.A.

(57) ABSTRACT

The efficiency of compressed air vehicle is enhanced by adapting the compressed air storage tank with a Magnus rotor that creates lift so as to reduce the effective weight of the tank during operation. A compressed air tank has an outlet in fluid communication with the inlet of a compressed air motor. Air leaving the compressed air motor is caused to flow across the Magnus rotor whereby lift is generated to counter gravitational force thereby reducing the effective weight of the system. A battery powered electric fan has an inlet disposed to draw air across the Magnus rotor thereby increasing the velocity of the air so as to maximize the Magnus effect. A thermoelectric cooler transfers heat across the compressed air motor, i.e. from air exiting the compressed air motor outlet, to the air entering the compressed air motor inlet, whereby the temperature of the air entering the compressed air motor is increased resulting in increased pressure. Conversely, transferring heat from the air exiting the compressed air motor and prior to flowing across the Magnus rotor, increases the density of the air flowing across the Magnus rotor so as to maximize the efficiency of the Magnus effect. Finally, the fan has an output in fluid communication with the input of a compressor, which re-compresses the air and delivers the re-compressed air to the storage tank.

5 Claims, 3 Drawing Sheets

COMPRESSED AIR VEHICLE HAVING ENHANCED PERFORMANCE THROUGH USE OF MAGNUS EFFECT

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to vehicles that are propelled using a source of compressed gas, such as air, and more particularly, to a system and method for improving the efficiency of such vehicles by use of one or more Magnus rotors that reduce the weight of the vehicle and while facilitating compression of gas to charge the compressed air tank.

2. Description of Related Art

It is known in the art to use compressed gas as a working fluid to drive an engine. This concept has been successfully used to propel a vehicle. So called compressed air cars used motors powered by compressed air. Such cars can be powered solely by air, or incorporate hybrid propulsion technology.

Compressed air cars are powered by motors fueled with compressed air which is stored in a tank at high pressure. Expansion of the compressed air drives the pistons, in a similar manner to the expansion of steam in a steam engine. Compressed air vehicles offer a number of advantages including: (1) the ability to be refueled using a simple air compressor; (2) compressed air engines can be manufactured cost effectively as they do not require cooling systems, spark plugs, mufflers etc.; (3) the expansion of the compressed air lowers its temperature such that it may be used as air conditioning; (4) compressed air engines significantly eliminate the use of hazardous chemicals such as gasoline, and battery acids; and (5) some compressed air vehicles are adapted to recover braking energy for use in compressing and storing air.

While compressed air vehicles provide a number of advantages over their internal combustion engine counterparts, large scale manufacture of compressed air vehicles has been slow to materialize. Various manufacturers are, however, currently investing in the research and development of compressed air cars. Indian manufacturer Tata Motors is planning a limited production run of compressed air vehicles for use in India and a few other countries. It is expected that the top-speed for this vehicle will be 68 mph with a range of 125 miles. The tanks containing the compressed air can be refilled at special stations, or using the on-board electric compressor in 3-4 hours. Moteur Development International (MDI), the French manufacturer of compressed air vehicles, and Zero Pollution Motors (ZPM) are planning a larger vehicle for the U.S. market in 2010. That car is rumored to have a range of 1000 miles utilizing a dual energy source.

As should be apparent, the art of compressed air vehicles is in its infancy, and there exists a need for advancements in the art to allow for the manufacture of compressed air vehicles.

BRIEF SUMMARY OF THE INVENTION

The present invention improves the efficiency of compressed air vehicle systems by adapting the compressed air storage tank with a Magnus rotor that creates lift so as to reduce the effective weight of the tank during operation. A compressed air tank has an outlet in fluid communication with the inlet of a compressed air motor. Air leaving the compressed air motor is caused to flow across the Magnus rotor whereby lift is generated to counter gravitational force thereby reducing the effective weight of the system. A battery powered electric fan has an inlet disposed to draw air across the Magnus rotor thereby increasing the velocity of the air so as to maximize the Magnus effect. A thermoelectric cooler transfers heat across the compressed air motor, i.e. from air exiting the compressed air motor outlet, to the air entering the compressed air motor inlet, whereby the temperature of the air entering the compressed air motor is increased resulting in increased pressure. Conversely, transferring heat from the air exiting the compressed air motor and prior to flowing across the Magnus rotor, increases the density of the air flowing across the Magnus rotor so as to maximize the efficiency of the Magnus effect. Finally, the fan has an output in fluid communication with the input of a compressor, which re-compresses the air and delivers the re-compressed air to the storage tank.

Accordingly, it is an object of the present invention to provide an improved compressed air vehicle.

Another object of the present invention is to improve the efficiency of compressed air vehicles by harnessing the Magnus effect.

Still another object of the present invention is to improve the efficiency of a compressed air engine by heating the compressed air prior to introduction into the compressed air motor.

These and other objects are met by the present invention which will become more apparent from the accompanying drawing and the following detailed description of the drawings and preferred embodiments.

DETAILED DESCRIPTION OF THE INVENTION

Figure 1:
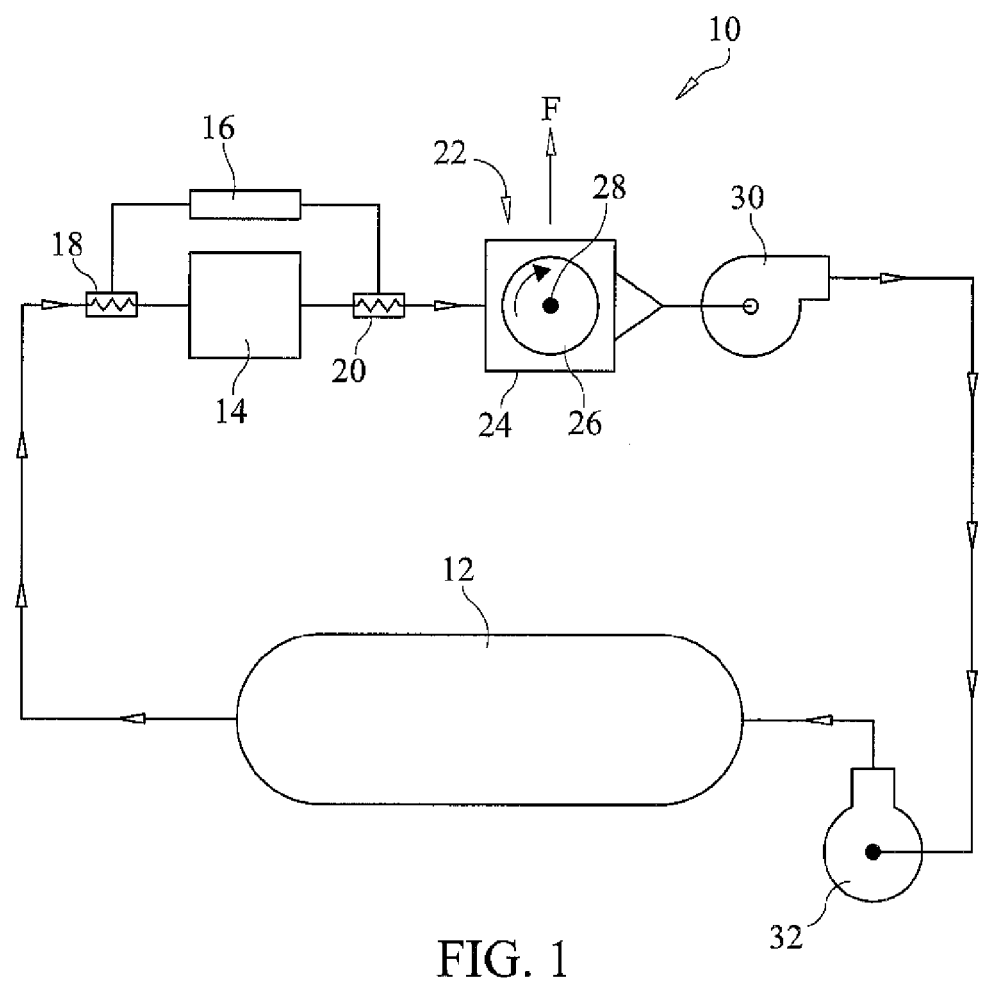
FIG. 1 is a schematic illustration of a compressed air engine system in accordance with the present invention.
Figure 2:
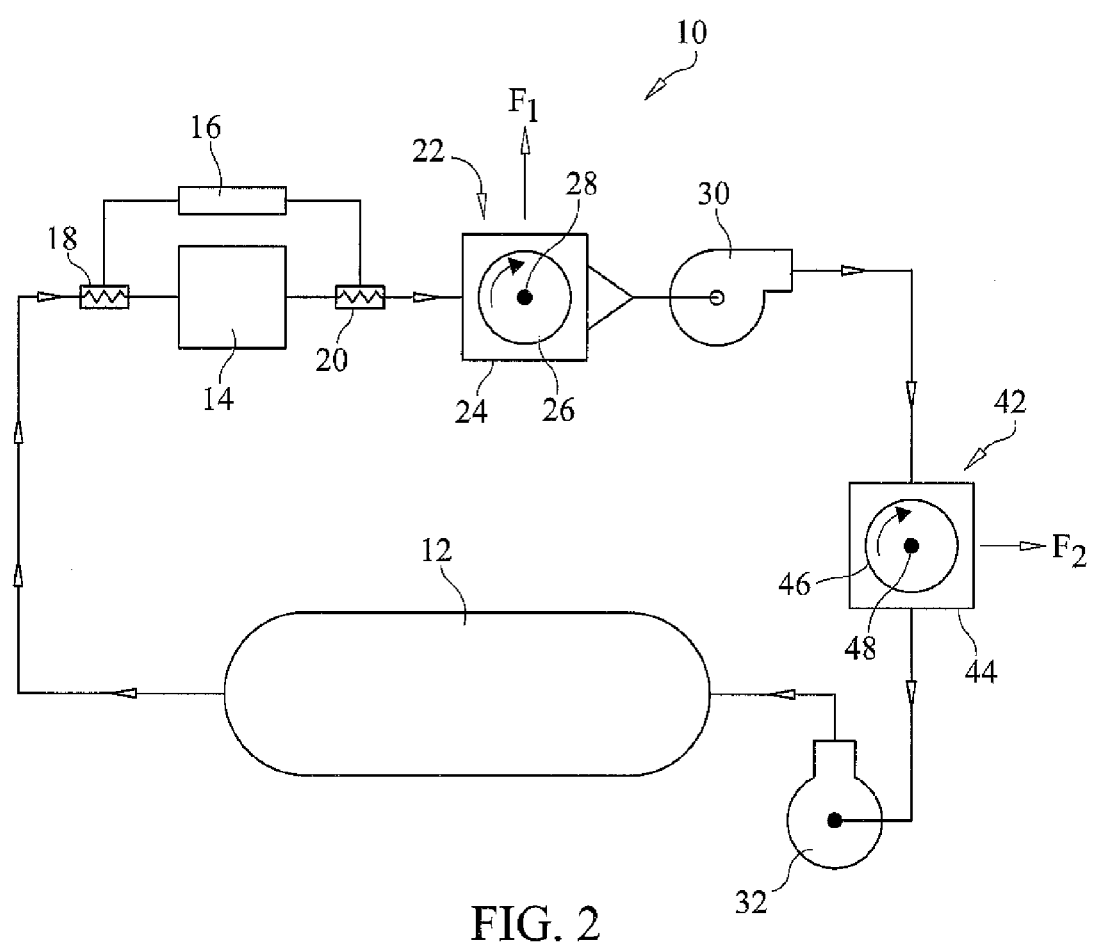
FIG. 2 is a schematic illustration of an alternate embodiment compressed air engine system in accordance with the present invention.
Figure 3:
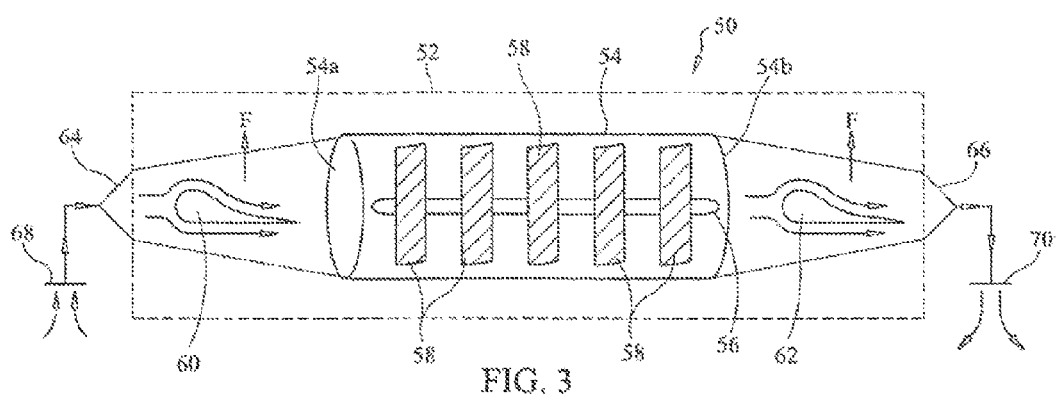
FIG. 3 is a schematic illustration of an alternate embodiment Magnus rotor adapted with internal fan blades for drawing air through the Magnus rotor and across inlet and outlet airfoil structures to create additional forces.

With reference now to the drawings, FIGS. 1-3 depict various embodiments of the present invention. FIG. 1 is a schematic illustration of a compressed air engine system, generally referenced as 10, for use in propelling a vehicle in accordance with the present invention. Efficiency of the compressed air vehicle is enhanced by adapting the compressed air storage tank with a Magnus rotor that creates lift so as to reduce the effective weight of the tank during operation as more fully discussed herein. A compressed air tank 12 has an outlet in fluid communication with the inlet of a compressed air motor 14 for routing high pressure air from tank 12 to motor 14. Compressed air motor 14 comprises a motor that produces power output using any suitable compressed fluid, preferably air.

A thermoelectric cooler 16 is connected to heat exchangers 18 and 20 disposed on the outlet and inlet sides respectively of compressed air motor 14 as illustrated in FIG. 1. Thermoelectric cooler 16 transfers heat across the compressed air motor 14, i.e. from air exiting the compressed air motor outlet, to the air entering the compressed air motor inlet, whereby the temperature of the air entering the compressed air motor is increased resulting in increased pressure. Conversely, transferring heat from the air exiting the compressed air motor and prior to flowing across the Magnus rotor, increases the density of the air flowing across the Magnus rotor so as to maximize the efficiency of the Magnus effect.

Air leaving the compressed air motor 14 is caused to flow across the Magnus rotor assembly, generally referenced as 22, that preferably includes a housing 24 containing a Magnus rotor 26 configured for rotation and driven by an external source (not shown) about an axis 28. Magnus rotor assembly 22 is preferably connected to tank 12 via a rigid connection. Air flowing around Magnus rotor generates a lifting force "F" in the direction illustrated to counter gravitational force thereby reducing the effective weight of the system. A fan 30 has an inlet in fluid communication with housing 24 of Magnus rotor assembly 22 to increase the velocity of air flowing across Magnus rotor 26 so as to maximize the Magnus effect. Fan 30 has a discharge outlet in fluid communication with the input of a compressor 32, which re-compresses the air and delivers the re-compressed air to the storage tank 12.

As should be apparent, the present invention advances the art of compressed air vehicles by use of the Magnus effect and thermoelectric heating/cooling of the air across the compressed air motor.

FIG. 2 depicts an alternate embodiment system incorporating a first and second Magnus rotor assemblies, referenced as 22 and 42 respectively. As with the preferred embodiment, a compressed air tank 12 has an outlet in fluid communication with the inlet of a compressed air motor 14 for routing high pressure air from tank 12 to motor 14. A thermoelectric cooler 16 is connected to heat exchangers 18 and 20 disposed on the outlet and inlet sides respectively of compressed air motor 14. Thermoelectric cooler is provided with electrical power by an external power source (not shown), such as a battery. Air leaving the compressed air motor 14 is caused to flow across the first Magnus rotor assembly, generally referenced as 22, that preferably includes a housing 24 containing a Magnus rotor 26 configured for rotation and driven by an external source (not shown) about an axis 28. Air flowing around Magnus rotor generates a lifting force "$F_1$" in the direction illustrated to counter gravitational force thereby reducing the effective weight of the system. A fan 30 has an inlet in fluid communication with housing 24 of Magnus rotor assembly 22 to increase the velocity of air flowing across Magnus rotor 26 so as to maximize the Magnus effect. Fan 30 has a discharge outlet in fluid communication with a second Magnus assembly, generally referenced as 42, having a housing 44 containing a Magnus rotor 46 configured for rotation and driven by an external source (not shown) about an axis 48. Air flowing around the Magnus rotor 46 of the second Magnus rotor assembly 42 generates a force "$F_2$" in the direction illustrated to assist in propelling the vehicle. The second Magnus rotor assembly has an output in fluid communication with the input of compressor 32, which re-compresses the air and delivers the re-compressed air to the storage tank 12. Compressor 32 is provided with electrical power by an external power source (not shown).

FIG. 3 is a schematic illustration of an alternate embodiment Magnus rotor assembly, generally referenced as 50, adapted with internal fan blades for drawing air through the Magnus rotor and across inlet and outlet airfoil structures to create additional forces. In this embodiment, a housing 52 contains a Magnus rotor 54 which comprises a cylinder configured for rotation about an axle 56. In this embodiment, Magnus rotor 54 comprises a generally hollow cylindrical structure having a plurality of fan blades 58 mounted to axle 56 within Magnus rotor 54. In addition, airfoils, referenced as 60 and 62, are positioned in proximity to the inlet 54a and outlet 54b ends of Magnus rotor 54 with leading edges facing upstream as disclosed in FIG. 3. Fan blades 58 draw air into housing 52 via a housing inlet 64 such that the air flows across airfoil 60 through Magnus rotor inlet 54a, through Magnus rotor 54, such that the air ultimately exits Magnus rotor outlet 54 and flows over air foil 62 prior to exiting housing outlet 66. In a preferred embodiment, housing inlet 64 is in fluid communication with an air intake 68 disposed underneath the vehicle such to generate a suction effect that improves handling. In addition, housing outlet 66 is in fluid communication with an air outlet 70 that exhausts air toward the rear of the vehicle so as to generate additional propulsive force. As should be apparent, airfoils 60 and 62 create lifting forces, referenced as "F", which forces may be selectively oriented to minimize the weight of the vehicle (when directed against the force of gravity) and/or to assist in providing a propulsive force (when directed forward in the direction of travel).

The present invention further contemplates being configured with air intake 68 disposed so as to draw in air that has flowed around one of the Magnus rotors (26 and/or 46). In accordance with this embodiment, air intake 68 may be selectively disposed on the leaving air side of the Magnus rotor and positioned either in proximity to either the bottom or top thereof so as to create an area of reduced pressure. The location may be varied to accomplish a desired result. Once drawn in from the leaving air side of the Magnus rotor, the air may be directed across airfoil 60 and through the Magnus rotor as illustrated in FIG. 3. As should be apparent, any Magnus rotor used in accordance with the present invention, such as Magnus rotors 26 and 46, may be adapted with air intakes 68 as disclosed herein. A further enhancement may be achieved by locating inlet 64 such that it is disposed at a generally right angle at the lower portion of housing 52 (i.e. below airfoil 60) so as to create an area of increased air pressure such that air flowing across the air foil creates additional lift.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A compressed air engine system for use in propelling a vehicle, said compressed air engine system comprising:
    a compressed air tank having an inlet and an outlet;
    a compressed air motor having an inlet in fluid communication with said compressed air tank outlet, and an outlet;

a first heat exchanger connected in proximity to the inlet of said compressed air motor, and a second heat exchanger connected in proximity to the outlet of said compressed air motor;

a thermoelectric cooler in heat transfer communication with said first and second heat exchangers, said thermoelectric cooler absorbing heat from said second heat exchanger and transferring heat absorbed therefrom to said first heat exchanger, whereby the pressure differential across said compressed air motor is increased;

a Magnus rotor assembly having housing with an air an inlet and an air outlet, said housing containing a Magnus rotor configured for rotation about an axis, whereby air flowing from said housing inlet to said housing outlet flows across said Magnus rotor thereby creating a force;

a fan, having an inlet in fluid communication with the outlet of said housing, and an outlet; and a compressor having an inlet in fluid communication with said fan outlet, and an outlet in fluid communication with the inlet of said compressed air tank.

2. A compressed air engine system according to claim 1, wherein said force is directed in opposition to gravitational forces.

3. A compressed air engine system according to claim 1, further including a second Magnus rotor assembly disposed in fluid communication between said fan and said compressor, said second Magnus rotor assembly generating a force which aids in propelling the vehicle.

4. A compressed air engine system according to claim 1, wherein said force is directed to aid in propelling the vehicle.

5. A compressed air engine system for use in propelling a vehicle, said compressed air engine system comprising:

a compressed air tank having an inlet and an outlet;

a compressed air motor having an inlet in fluid communication with said compressed air tank outlet, and an outlet;

a first heat exchanger connected in proximity to the inlet of said compressed air motor, and a second heat exchanger connected in proximity to the outlet of said compressed air motor;

a thermoelectric cooler in heat transfer communication with said first and second heat exchangers, said thermoelectric cooler absorbing heat from said second heat exchanger and transferring heat absorbed therefrom to said first heat exchanger so as to increase the pressure differential between said inlet and said outlet;

a first Magnus rotor assembly having housing with an air an inlet and an air outlet, said housing containing a Magnus rotor configured for rotation about an axis, whereby air flowing from said housing inlet to said housing outlet flows across said Magnus rotor thereby creating a force, said force directed in opposition to gravitational forces;

a fan, having an inlet in fluid communication with the outlet of said housing, and an outlet;

a compressor having an inlet in fluid communication with said fan outlet, and an outlet in fluid communication with the inlet of said compressed air tank;

a second Magnus rotor assembly disposed in fluid communication between said fan and said compressor, said second Magnus rotor assembly including a Magnus rotor generating a force directed to aid in propelling the vehicle forward.

\* \* \* \* \*